US012585318B2

(12) United States Patent
Nakagawa et al.

(10) Patent No.: US 12,585,318 B2
(45) Date of Patent: Mar. 24, 2026

---

(54) EVALUATION DEVICE AND PROGRAM

(71) Applicant: DAIKIN INDUSTRIES, LTD., Osaka (JP)

(72) Inventors: Yoshihiro Nakagawa, Osaka (JP); Shuji Furui, Osaka (JP)

(73) Assignee: DAIKIN INDUSTRIES, LTD, Osaka (JP)

(*) Notice: Subject to any disclaimer, the term of this patent is extended or adjusted under 35 U.S.C. 154(b) by 173 days.

(21) Appl. No.: 18/390,076

(22) Filed: Dec. 20, 2023

(65) Prior Publication Data

US 2024/0118737 A1 Apr. 11, 2024

Related U.S. Application Data

(63) Continuation of application No. PCT/JP2022/019092, filed on Apr. 27, 2022.

(30) Foreign Application Priority Data

Jun. 28, 2021 (JP) ................................. 2021-106594

(51) Int. Cl.
*G06F 1/3206* (2019.01)
*G06Q 10/063* (2023.01)
(Continued)

(52) U.S. Cl.
CPC ......... *G06F 1/3206* (2013.01); *G06Q 10/063* (2013.01); *G06Q 50/06* (2013.01); *H02J 3/14* (2013.01); *H02J 13/00001* (2020.01)

(58) Field of Classification Search
CPC .... G06F 1/3206; G06Q 10/063; G06Q 50/06; H02J 13/00001; H02J 2310/14; H02J 2310/60; H02J 3/14
See application file for complete search history.

(56) References Cited

U.S. PATENT DOCUMENTS

| | | | |
|---|---|---|---|
| 12,270,839 B2 * | 4/2025 | Lan ..................... | G01R 21/1338 |
| 2014/0320314 A1 * | 10/2014 | Gagnon ................. | G08C 19/02 |
| | | | 340/870.39 |
| 2017/0277213 A1 * | 9/2017 | Izumihara .............. | G06Q 50/06 |

FOREIGN PATENT DOCUMENTS

| | | |
|---|---|---|
| JP | 2002-327947 A | 11/2002 |
| JP | 2003-70163 A | 3/2003 |

(Continued)

OTHER PUBLICATIONS

International Search Report (PCT/ISA/210), issued in PCT/JP2022/019092, dated Aug. 9, 2022.

*Primary Examiner* — Terrell S Johnson
(74) *Attorney, Agent, or Firm* — Birch, Stewart, Kolasch & Birch, LLP

(57) ABSTRACT

[Object] To correct a power consumption record in a period in which energy-saving control is performed and a power consumption record in a period in which the energy-saving control is not performed in accordance with a purpose of the comparison, and to enable evaluation of power consumption from various viewpoints.
[Solution] A terminal device configured to evaluate power consumption of equipment includes a communication control unit configured to acquire a power consumption record of the equipment, and a processing unit configured to output data related to power consumption records before and after an energy-saving operation of the equipment. The processing unit performs correction I and correction II (II') to make one of a power consumption period in an operation period before the energy-saving operation and a power consumption record in an operation period after the energy-saving operation comparable with the power consumption record in the other operation period, and then outputs data related to the power consumption records before and after the energy-saving operation.

9 Claims, 12 Drawing Sheets

(51) Int. Cl.
    *G06Q 50/06*      (2012.01)
    *H02J 3/14*       (2006.01)
    *H02J 13/00*     (2006.01)

(56)            References Cited

FOREIGN PATENT DOCUMENTS

| JP | 2006292282 A | * 10/2006 | ............. G06F 17/60 |
| WO | WO 2014/199427 A1 | 12/2014 | |
| WO | WO 2016/056113 A1 | 4/2016 | |

* cited by examiner

400

TERMINAL DEVICE

DISPLAY UNIT — 410

RECEPTION UNIT — 420

DISPLAY CONTROL UNIT — 430

PROCESSING UNIT — 440

COMMUNICATION CONTROL UNIT — 450

410

| [kWh] | | APRIL | MAY | JUNE | JULY | AUGUST | SEPTE- MBER | OCTO- BER | NOVEM- BER | DECEM- BER | JANU- ARY | FEBRU- ARY | MARCH |
|---|---|---|---|---|---|---|---|---|---|---|---|---|---|
| □ | PREVIOUS YEAR (NO CONTROL) | 21333.7 | 17303.9 | 25154.2 | 39950.7 | 59945.9 | 46800.2 | 17997.2 | 15870.8 | 52240.8 | 59128.2 | 60248.0 | 33979.9 |
| ▨ | CURRENT YEAR (WITH CONTROL) | 14358.2 | 8388.5 | 24139.9 | 32059.7 | 50417.6 | 31400.7 | 11229.6 | 16543.5 | 44680.2 | 56659.9 | 42752.1 | 28031.0 |

EVALUATION DEVICE AND PROGRAM

CROSS REFERENCE TO RELATED APPLICATIONS

This application is a Continuation of PCT International Application No. PCT/JP2022/019092, filed on Apr. 27, 2022, which claims under 35 U.S.C. 119(a) to Patent Application No. 2021-106594, filed in Japan on Jun. 28, 2021, all of which are hereby expressly incorporated by reference into the present application.

TECHNICAL FIELD

The present disclosure relates to an evaluation device and a program.

BACKGROUND ART

PTL 1 describes the following configuration. Specifically, an approximate formula of a first power consumption and outside air information is calculated from the first power consumption and the outside air information in each second period in a first period in which energy-saving operation control is started. A second power consumption, under an assumption that energy-saving operation is performed, in a third period preceding the first period is calculated using the outside air information in each second period in the third period and the approximate formula. An energy-saving rate under an assumption that energy-saving operation is performed is calculated based on a recorded power consumption and the second power consumption in each fourth period longer than the second period in the third period. An energy-saving amount achieved by the energy-saving operation is calculated from the calculated energy-saving rate and the first power consumption.

CITATION LIST

Patent Literature

PTL 1: Japanese Unexamined Patent Application Publication No. 2003-70163

SUMMARY OF INVENTION

Technical Problem

Comparison in power consumption record between periods in which the energy-saving control is and is not performed requires various evaluations such as confirmation of an influence of difference in the environment such as temperature difference, and testing of the accuracy in the comparison, in addition to the confirmation of energy-saving effects.

An object of the present disclosure is to correct the power consumption records in periods in which the energy-saving control is and is not performed in accordance with a purpose of the comparison, and to enable evaluation of power consumption from various viewpoints.

Solution to Problem

An evaluation device of the present disclosure is an evaluation device configured to evaluate power consumption of equipment, and includes: an acquisition unit configured to acquire a power consumption record of the equipment; and an output unit configured to output data related to power consumption records before and after an energy-saving operation of the equipment, wherein the output unit corrects one of a power consumption record in an operation period before the energy-saving operation and a power consumption record in an operation period after the energy-saving operation to be comparable with the power consumption record in the other operation period, and then outputs data related to the power consumption records before and after the energy-saving operation.

With this configuration, the power consumption record in the period in which the energy-saving control is performed and the power consumption record in the period in which the energy-saving control is not performed can be corrected in accordance with a purpose of the comparison, so that power consumption can be evaluated from various viewpoints.

In this configuration, the output unit may perform environmental condition correction in which one of the power consumption record before the energy-saving operation and the power consumption record after the energy-saving operation is corrected to correspond to an outside air environmental condition in an operation period related to the power consumption record in the other operation period.

With this configuration, comparison in effects of the energy-saving operation can be made between the periods before and after the energy-saving operation, without being affected by an outside air environment.

The output unit may further perform energy-saving correction in which a change in power consumption due to an energy-saving measure is corrected for the power consumption record as a result of the environmental condition correction.

This configuration enables the accuracy of the correction by the output unit to be confirmed.

The output unit may perform energy-saving correction in which a change in power consumption due to an energy-saving measure is corrected for the power consumption record in the other operation period different from the power consumption record as a result of the environmental condition correction.

This configuration enables the accuracy of the correction by the output unit to be confirmed.

The output unit may perform energy-saving correction in which a change in power consumption due to an energy-saving measure is corrected for one of the power consumption record before the energy-saving operation and the power consumption record after the energy-saving operation.

This configuration enables a difference in power consumption between the periods before and after the energy-saving operation due to a condition other than the energy-saving measure to be confirmed.

The output unit may further perform environmental condition correction in which the power consumption record as a result of the energy-saving correction is corrected to correspond to an outside air environmental condition in an operation period related to the power consumption record in the other operation period.

This configuration enables the accuracy of the correction by the output unit to be confirmed.

The output unit may perform environmental condition correction in which the power consumption record in the other operation period different from the power consumption record as a result of the energy-saving correction is corrected to correspond to an outside air environmental condition in the operation period related to the power consumption record as a result of the energy-saving correction.

3
4

This configuration enables the accuracy of the correction by the output unit to be confirmed.

A display unit may be further provided that is configured to display the power consumption records in the individual operation periods before and after the energy-saving operation, output from the output unit.

This configuration enables the user to intuitively and visually recognize the comparison result of the corrected power consumption records easily.

A program of the present disclosure is a program causing a computer serving as an evaluation device configured to evaluate power consumption of equipment, to function as: an acquisition unit configured to acquire a power consumption record of the equipment; and an output unit configured to output data related to power consumption records before and after an energy-saving operation of the equipment, wherein the computer functioning as the output unit corrects one of a power consumption record in an operation period before the energy-saving operation and a power consumption record in an operation period after the energy-saving operation to be comparable with the power consumption record in the other operation period, and then outputs data related to the power consumption records before and after the energy-saving operation.

With the computer in which the program is installed, power consumption record in the period in which the energy-saving control is performed and the power consumption record in the period in which the energy-saving control is not performed can be corrected in accordance with a purpose of the comparison, so that power consumption can be evaluated from various viewpoints.

DESCRIPTION OF EMBODIMENTS

An embodiment will be described below in detail with reference to the accompanying drawings.

<System Configuration>

Figure 1:
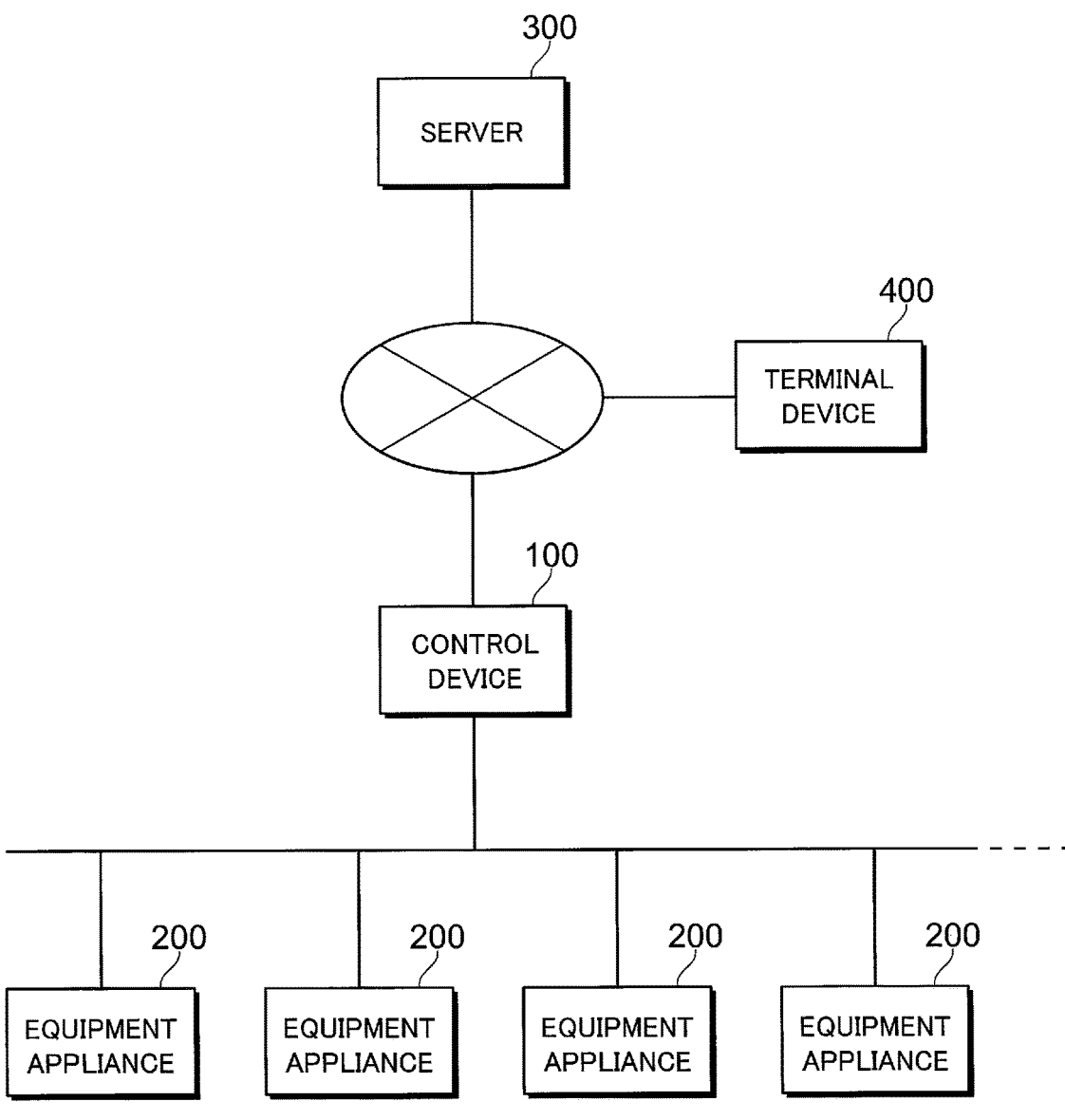
FIG. 1 is a diagram illustrating an overall configuration of a control system for an equipment appliance, for which an evaluation device according to the present embodiment is used.

FIG. 1 is a diagram illustrating an overall configuration of a control system for an equipment appliance, for which an evaluation device according to the present embodiment is used. This control system includes a control device 100, equipment appliances 200 that are controlled apparatuses, a server 300, and a terminal device 400. The control device 100 and the equipment appliances 200 are connected through a network. The network may be a local area network (LAN) based on a dedicated line, a wide area network (WAN), a virtual private network (VPN) set on the Internet, or the like.

The equipment appliance 200 is equipment/appliance that operates using power. The control device 100 controls the operation of one or a plurality of equipment appliances 200. FIG. 1 illustrates a configuration example in which the control device 100 controls a plurality of equipment appliances 200. The equipment appliance 200 may be any type of equipment/appliance as long as the equipment/appliance operates using power and the operation is controlled by the control device 100. In the following description, an example in which the control system of the present embodiment is applied to control on an air conditioner as a specific example of the equipment appliance 200 may be described.

Further, the equipment appliance 200 is provided with a control unit that controls the equipment appliance 200 in accordance with an instruction from the control device 100. The control device 100 generates an instruction (hereafter, referred to as a "control instruction") for controlling the equipment appliance 200 which is a control target, and transmits the generated control instruction to each equipment appliance 200. Each equipment appliance 200 acquires the control instruction from the control device 100, and then the control unit of the equipment appliance 200 performs the setting of the equipment appliance 200 and controls the operation in accordance with the acquired control instruction.

The control device 100, the server 300, and the terminal device 400 are connected through a network. In the configuration example illustrated in FIG. 1, one control device 100 connected to the server 300 is illustrated, but a plurality of control devices 100 are actually connected to the server 300. One or a plurality of equipment appliances 200 are connected to each control device 100. As the network connecting the control device 100 and the server 300, the Internet is used, for example. Alternatively, a LAN or a WAN may be used.

The terminal device 400 is a device that is connected to the server 300 to transmit and receive information to and from the server 300, and processes information on a power consumption record of the equipment appliance 200 (hereafter, referred to as "power consumption record information"). As will be described in detail below, the terminal device 400 acquires the power consumption record information of the equipment appliance 200 managed by the server 300. The terminal device 400 executes processing, such as correction related to an energy-saving operation and an environmental condition, on the acquired power consumption record information and presents the resultant information to the user.

5

6

<Relationship Between Electricity Charge and Control on Equipment Appliance 200>

Here, the electricity charge will be described. The electricity charge is determined for each month mainly by a basic rate and a power rate. The basic rate is calculated based on a basic rate unit price and contract power. The contract power is the maximum value of the maximum demand power within one year from the current month. The maximum demand power is the maximum value of the average power consumption in each time period (demand time period: 30 minutes) in a month. The average power consumption is an average value of the demanded power (power consumption) in each time period. The power rate is calculated based on the power rate unit price and the monthly power consumption amount.

As described above, the contract power is the maximum value of the maximum demand power within a past year. Therefore, when the maximum demand power in a certain month (in other words, the average power consumption in a certain time period in the month) reaches the contract power, even if the maximum demand power lower than the contract power is continuously maintained after the month, the basic rate based on the contract power is charged for a year. When the average power consumption in a certain time period exceeds the value of the contract power at that point and reaches the maximum demand power of the month including the time period, the average power consumption (maximum demand power) in this time period is used as the new contract power for the calculation of the basic rate thereafter.

The power rate unit price is set in various ways. The power rate unit price may be set to vary based on a predetermined condition. For example, the power rate unit price may be set to vary depending on the time zone of a day, whether the day is a weekday or a holiday, the season, or the like. In addition, there is a case where power is traded in a market, and the power rate unit price may be set to vary to reflect a trade price of the power in the market.

The equipment appliance 200 may be controlled in such a manner to reduce the electricity charge required for the operation of the equipment appliance 200. In this case, the equipment appliance 200 is required to be controlled such that the average power consumption does not exceed the current contract power. When the power rate unit price varies, higher efficiency in terms of reduction of the electricity charge can be achieved in a case where the power consumption is reduced in a time zone in which the unit price is high, compared with a case where the power consumption is reduced in a time zone in which the unit price is low. Still, while the power rate unit price affects only the power rate for each time period, the contract power affects the electricity charge over a year from the current month. Therefore, priority is given to the control in consideration of the average power consumption over the control in consideration of the variation in the power rate unit price. The control performed to prevent the average power consumption from exceeding the current contract power is referred to as demand control.

The electricity charge is charged to a consumer who is a contractor of power supply. The consumer has one or a plurality of equipment appliances 200. The control device 100 controls the equipment appliance 200 of one or a plurality of consumers. The control device 100 performs control on the equipment appliance 200 of each consumer in consideration of the average power consumption in each time period and the power rate unit price according to the electricity charge (basic rate and power rate) set for each consumer.

<Configuration of Server 300>

Figure 2:
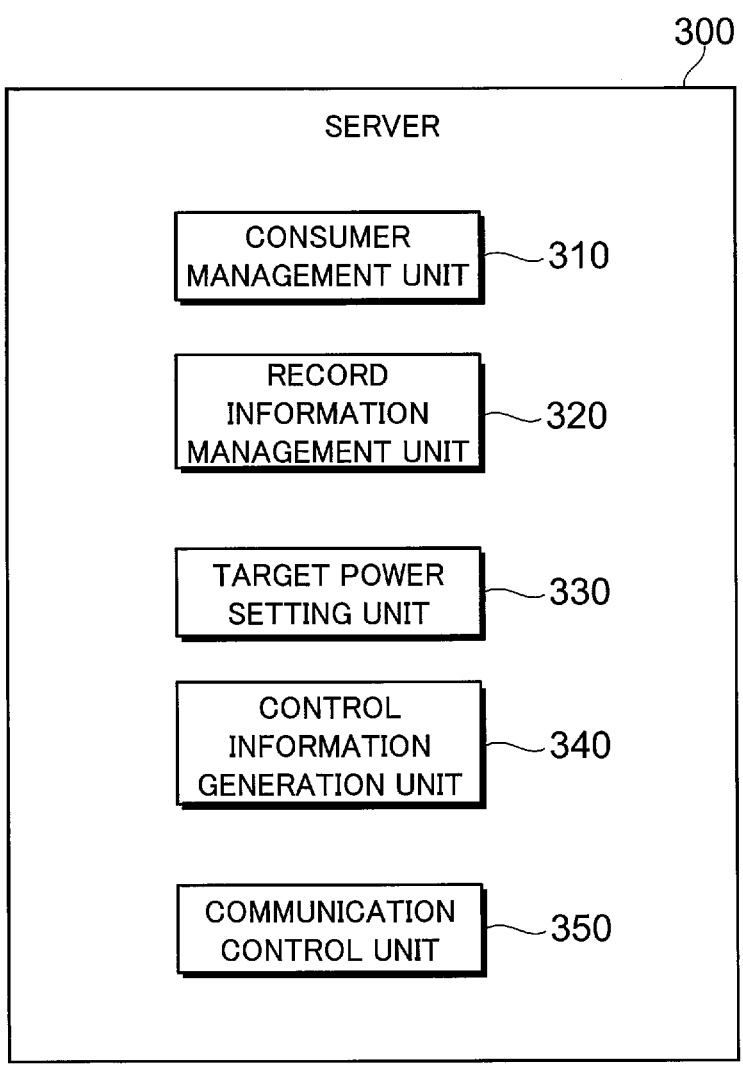
FIG. 2 is a diagram illustrating a configuration of a server.

FIG. 2 is a diagram illustrating a configuration of the server 300. The server 300 is implemented as, for example, a server (what is known as a cloud server) or the like established on a network cloud environment. The server 300 includes a consumer management unit 310, a record information management unit 320, a target power setting unit 330, a control information generation unit 340, and a communication control unit 350.

The consumer management unit 310 manages consumer information. The consumer information includes, for example, contract power of each consumer, information on the equipment appliance 200 of each consumer, and the like, in addition to information for identifying the consumer him or herself.

The record information management unit 320 acquires and manages record information on the equipment appliance 200 of each consumer. The record information includes information related to the operation status of the equipment appliance 200 (hereafter referred to as "operation information"), the power consumption record information, and the like. The power consumption record information includes an average power consumption, a power consumption amount, and the like in each time period based on the actual operation of the equipment appliance 200. The information on the average power consumption in each time period includes the date and time for identifying each time period. The record information management unit 320 acquires record information from the control device 100 that controls the equipment appliance 200 of each consumer, for example. After the end of each time period, the record information management unit 320 acquires record information in the ended time period and stores the record information in a storage device (not illustrated). As a method of acquiring the record information, the record information may be acquired at any time when the record information is acquirable after the end of each time period, and the record information in a plurality of time periods may be acquired periodically (once a day for example) and collectively.

The target power setting unit 330 sets a target value (hereafter, referred to as "target power") of average power consumption by the equipment appliance 200 of each consumer in each time period. When the average power consumption by the consumer consuming power exceeds the contract power, this average power consumption is set as the new contract power, and the basic rate in the electricity charge increases. Thus, the demand control is managed in such a manner that the target power based on the contract power is set, and the average power consumption in each time period is controlled so as not to exceed the target power. The target power is set to a value equal to or less than the contract power, for example, a value lower than the contract power by a certain value.

The target power setting unit 330 may predict the average power consumption by the equipment appliance 200 of each consumer in each time period, and set the target power for the average power consumption by each consumer in each time period based on the prediction result. The average power consumption can be predicted by various existing prediction methods. For example, the environmental information and the operation information on the equipment appliance 200 and the power consumption record may be accumulated, and the average power consumption may be predicted from the anticipated environment and operation state of the equipment appliance 200 in a future time period. Information such as the environmental information, the operation information, and the power consumption record of the equipment appliance 200 may be collected in each equipment appliance 200 and acquired via the control device 100, for example. For example, record information acquired from the control device 100 by the record information management unit 320 may be used as the operation information and the power consumption record information.

The control information generation unit 340 generates control information for controlling the equipment appliance 200 of each consumer. The control information is information for causing the control device 100 to control the equipment appliance 200 based on a predetermined control policy. For example, as the control policy based on the target power described above, control (demand control) may be performed to prevent the average power consumption of the equipment appliance 200 of the consumer in each time period from exceeding the target power of the time period of the consumer set by the target power setting unit 330. Control may be performed to reduce power consumption without significantly compromising the comfort and convenience of the user of the equipment appliance 200. The control based on the latter policy is hereafter referred to as energy-saving control. The control information is not limited to information for executing control based only on a single control policy, and may be information for executing control based on a plurality of control policies as long as the control contents do not conflict. For example, control information for simultaneously executing the demand control and the energy-saving control may be generated. Before a time period in which the control based on each control information starts, the control information generation unit 340 generates the control information for the time period.

The communication control unit 350 transmits the control information generated by the control information generation unit 340 to the control device 100 that controls the equipment appliance 200 of the consumer corresponding to each control information. Before a time period in which the control based on each control information starts, the communication control unit 350 transmits the control information for the time period to the control device 100. When transmitting the control information for each time period to the control device 100, the communication control unit 350 may transmit the control information for reducing the average power consumption from that in the time period immediately before the time period that is the target of the transmission, before transmitting the control information for increasing the average power consumption from that in the time period immediately before the time period that is the target of the transmission.

The communication control unit 350 transmits and receives information in response to an access request from the terminal device 400. Specifically, the communication control unit 350 transmits the power consumption record information requested by the terminal device 400 to the terminal device 400.

<Configuration of Control Device 100>

Figure 3:
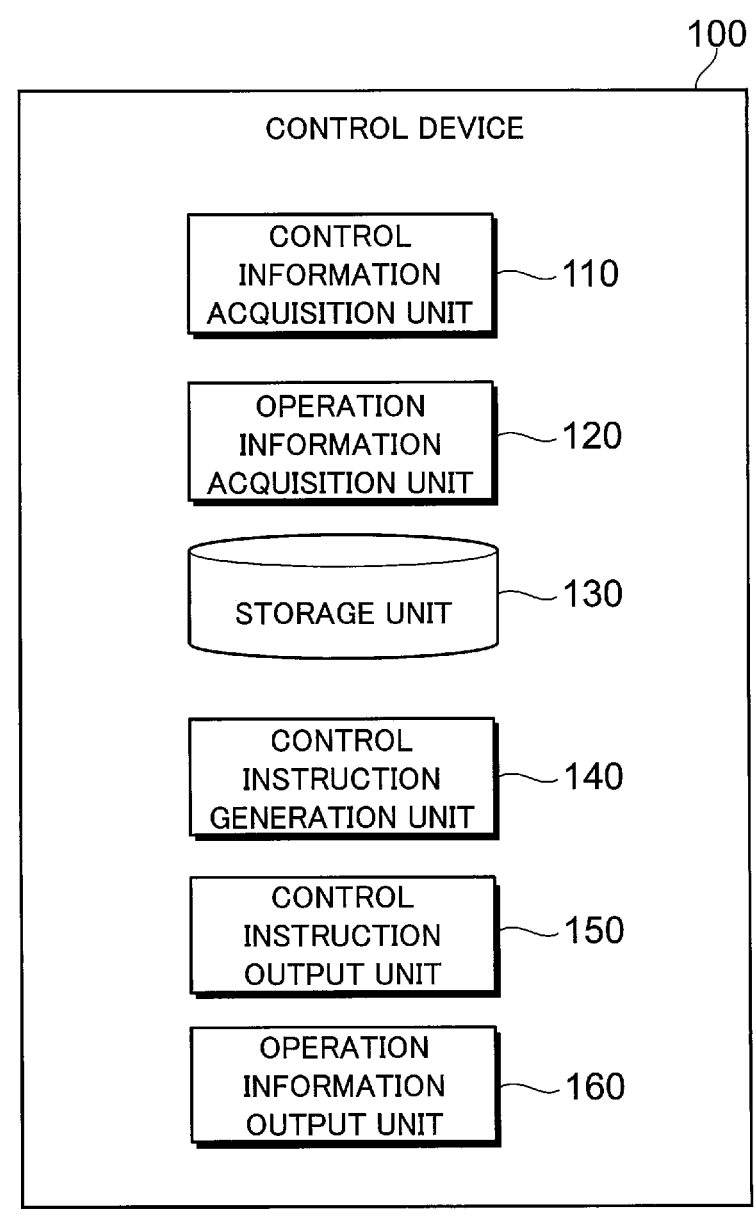
FIG. 3 is a diagram illustrating a configuration of a control device.

FIG. 3 is a diagram illustrating a configuration of the control device 100. The control device 100 is implemented as an information processing device connected to the server 300 and the equipment appliances 200 through a network. The control device 100 may be a device (for example, an edge server) provided in the vicinity of the equipment appliance 200 which is a control target, or may be a server (cloud server) established on a cloud environment. The control device 100 includes a control information acquisition unit 110, an operation information acquisition unit 120, a storage unit 130, a control instruction generation unit 140, a control instruction output unit 150, and an operation information output unit 160.

The control information acquisition unit 110 acquires control information on the equipment appliance 200 from the server 300. The control information includes information on the target power of the average power consumption set for each consumer. Before the control based on the control information for each time period is performed on the equipment appliance 200, the control information acquisition unit 110 acquires the control information for the corresponding time period.

The operation information acquisition unit 120 acquires operation information on the equipment appliance 200 which is the control target of the control device 100. The operation information acquired by the operation information acquisition unit 120 includes a wide variety of information related to the operation of the equipment appliance 200. For example, information indicating an operation state such as an operation rate or a continuous operation time of the equipment appliance 200 is included. In addition, various types of information expected to have an influence on the operation of the equipment appliance 200, such as a time zone in which the equipment appliance 200 is operated and whether the equipment appliance 200 is operated on weekdays or on holidays, may be included. Further, the operation information acquisition unit 120 may acquire information (environmental information) on an environment in which the equipment appliance 200 is installed, such as a temperature and humidity. These pieces of information can be acquired by various existing methods depending on the type of information. For example, the information may be directly acquired from the equipment appliance 200, or may be acquired from various sensor devices or the like. The date and time information is obtained by, for example, a clock function or a calendar function of the control device 100.

The storage unit 130 stores various types of information acquired by the control information acquisition unit 110 and the operation information acquisition unit 120. The control information acquired by the control information acquisition unit 110 is used to control the equipment appliance 200. The control information is stored in the storage unit 130 before the time period for which the control based on the control information is performed starts. The operation information on the equipment appliance 200 acquired by the operation information acquisition unit 120 is transmitted to the server 300 at a predetermined timing, and is managed by the record information management unit 320 of the server 300.

The control instruction generation unit 140 generates a control instruction for controlling the equipment appliance 200 based on the control information acquired by the control information acquisition unit 110. The control instruction generation unit 140 generates a control instruction for operating the equipment appliance 200 while preventing the average power consumption by the equipment appliance 200 of each consumer in each time period from exceeding the target power set for the consumer for each time period. When one consumer has a plurality of equipment appliances 200, the control instruction is generated for each time period to prevent the integrated value of the average power consumptions by all the equipment appliances 200 of the one consumer from exceeding the target power of the corresponding time period. In this case, how the consumer allocates the power to the plurality of his or her equipment appliances 200 to prevent the target power from being exceeded is not particularly limited. For example, the power may be equally allocated according to the type of the equipment appliance 200, the scale of the apparatus, or the like. In addition, sufficient power may be allocated to a certain equipment appliance 200, and the remaining power may be allocated to other equipment appliances 200. Alternatively, in a certain time period, some of the equipment appliances 200 may not be operated, and the power may be consumed only by the rest of the equipment appliances 200. The control instruction generation unit 140 may generate a control instruction with reference to the operation information on the equipment appliance 200 acquired by the operation information acquisition unit 120.

The control instruction output unit 150 reads the control instruction generated by the control instruction generation unit 140 based on the control information acquired by the control information acquisition unit 110, from the storage unit 130, and transmits the control instruction to the equipment appliance 200 that is the control target of each control instruction, when the time period for which the control based on the control information is performed starts.

The operation information output unit 160 reads the operation information on the equipment appliance 200 acquired by the operation information acquisition unit 120 and held in the storage unit 130, from the storage unit 130, and transmits the operation information to the server 300, in accordance with a predetermined condition. The operation information may be read and transmitted in response to a request from the server 300, or may be periodically read and transmitted at a predetermined time of a day or the like.

<Hardware Configuration of Control Device 100 and Server 300>

Figure 4:
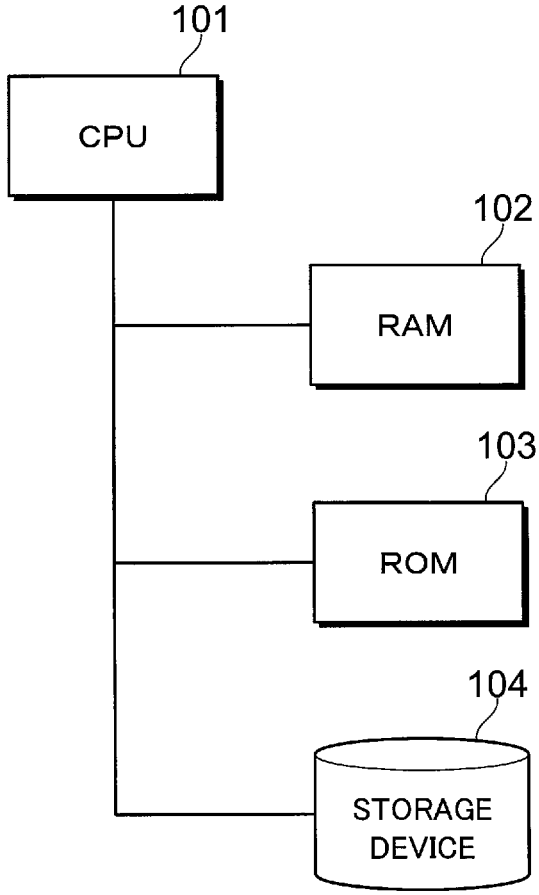
FIG. 4 is a diagram illustrating a hardware configuration example of the control device and the server.

FIG. 4 is a diagram illustrating a hardware configuration example of the control device 100 and the server 300. The control device 100 and the server 300 are implemented by, for example, a computer. Even when the control device 100 and the server 300 are implemented as servers established in a cloud environment, system resources of a physical computer on a network as illustrated in FIG. 4 are used for configuring the control device 100 and the server 300 as a virtual system.

A computer that implements the control device 100 and the server 300 includes a central processing unit (CPU) 101 that is an arithmetic unit, as well as a random access memory (RAM) 102, a read only memory (ROM) 103, and a storage device 104 that are storage units. The RAM 102 is a main storage device (main memory) and is used as a working memory when the CPU 101 executes calculation processing. The ROM 103 stores programs and data such as a set value prepared in advance, and the CPU 101 can execute processing by directly reading the program and the data from the ROM 103. The storage device 104 is a unit for storing programs and data. The storage device 104 stores a program, and the CPU 101 loads the program stored in the storage device 104 onto the main storage device and executes the program. In addition, a result of processing by the CPU 101 is stored and held in the storage device 104. For example, a magnetic disk device, a solid state drive (SSD), or the like is used as the storage device 104.

When the control device 100 is implemented by the computer illustrated in FIG. 4, the functions of the control information acquisition unit 110, the operation information acquisition unit 120, the control instruction generation unit 140, the control instruction output unit 150, and the operation information output unit 160 described with reference to FIG. 3 are implemented by, for example, the CPU 101 executing a program. The storage unit 130 is implemented by, for example, the RAM 102 or the storage device 104. When the server 300 is implemented by the computer illustrated in FIG. 4, the functions of the consumer management unit 310, the record information management unit 320, the target power setting unit 330, the control information generation unit 340, and the communication control unit 350 described with reference to FIG. 2 are implemented by, for example, the CPU 101 executing a program. The hardware configuration illustrated in FIG. 4 is merely an example of a case where the control device 100 and the server 300 are implemented by a computer.

<Configuration of Equipment Appliance 200>

Figure 5:
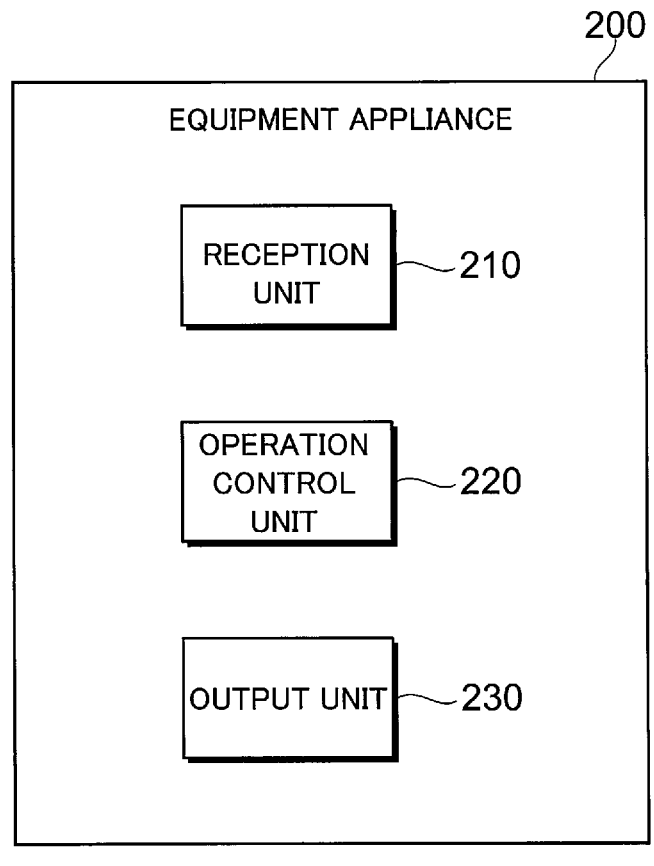
FIG. 5 is a diagram illustrating a configuration of the equipment appliance.

FIG. 5 is a diagram illustrating a configuration of the equipment appliance 200. The equipment appliance 200 includes a reception unit 210, an operation control unit 220, and an output unit 230. The equipment appliance 200 includes mechanisms and devices that operate to implement the functions of the equipment appliance 200 in accordance with the type of the equipment appliance 200. For example, when the equipment appliance 200 is an air conditioner, the equipment appliance 200 includes an indoor unit, an outdoor unit, and the like. When the equipment appliance 200 is lighting equipment, the equipment appliance 200 includes a lighting fixture, a control switch, and the like. The types and modes of such mechanisms and the like vary depending on the type of the equipment appliance 200, and therefore are not illustrated.

The reception unit 210 receives the control instruction output from the control device 100 through a network using a network interface (not illustrated).

The operation control unit 220 controls an operation of a mechanism or a device provided in the equipment appliance 200 based on the control instruction received by the reception unit 210. Specifically, for example, when the equipment appliance 200 is an air conditioner, the reception unit 210 receives information designating a set temperature as the control instruction, and the operation control unit 220 controls the operation of the indoor unit and the outdoor unit so that the received set temperature is achieved. While the example of the control related to the temperature setting is described herein, the control by the operation control unit 220 based on the control instruction can be applied to various types of control (such as, for example, control of humidity or a gas component) related to gas that can be controlled by the air conditioner. Further, also for various equipment appliances 200 other than the air conditioner, the operation control unit 220 executes control corresponding to the type of the equipment appliance 200 according to the control instruction received from the control device 100.

The output unit 230 outputs information on the operation state of the equipment appliance 200 to the control device 100 through a network by using a network interface (not illustrated).

The reception unit 210, the operation control unit 220, and the output unit 230 are implemented by, for example, a computer. The computer implementing the operation control unit 220 may have the configuration described with reference to FIG. 4. In this case, the functions of the reception unit 210, the operation control unit 220, and the output unit 230 are implemented by, for example, the CPU 101 illustrated in FIG. 4 executing a program. Alternatively, the functions of the reception unit 210, the operation control unit 220, and the output unit 230 may be implemented by dedicated hardware. For example, the functions may be implemented by an application specific integrated circuit (ASIC), a field-programmable gate array (FPGA), or other circuits. Furthermore, the reception unit 210, the operation control unit 220, and the output unit 230 may be implemented as a combination of a function implemented by the CPU 101 executing a program (software) and a function implemented by dedicated hardware.

<Configuration of Terminal Device 400>

Figure 6:
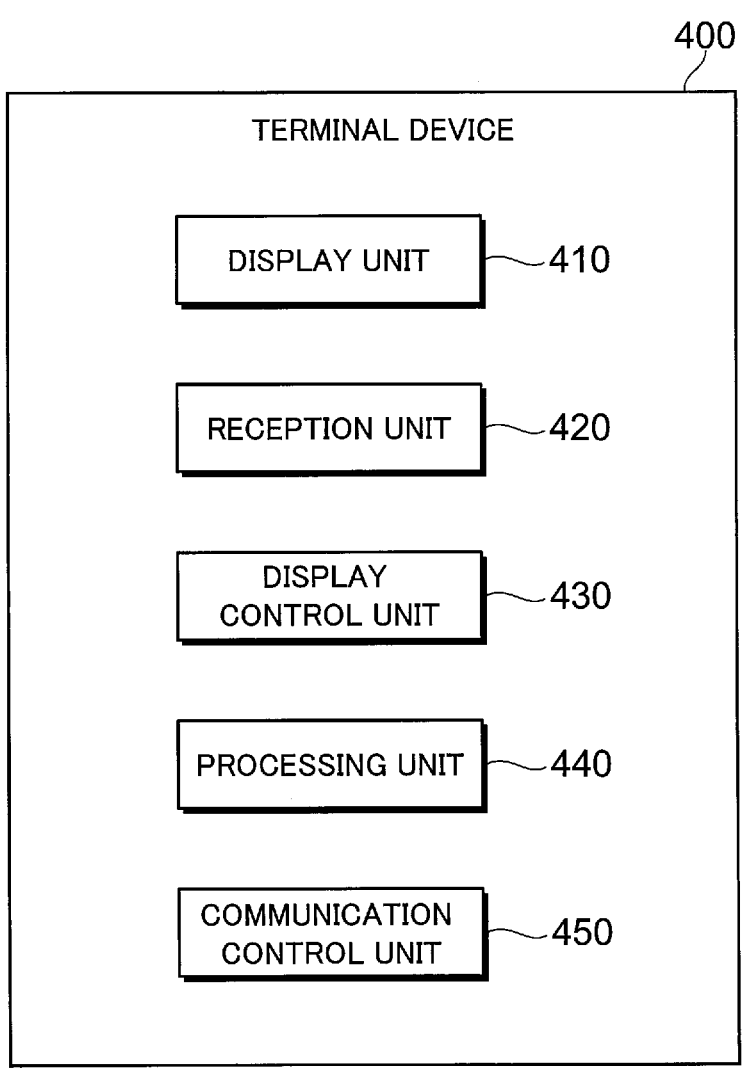
FIG. 6 is a diagram illustrating a configuration of a terminal device.

FIG. 6 is a diagram illustrating a configuration of the terminal device 400. The terminal device 400 is implemented by an information processing device that can be connected to the server 300 through a network. Specifically, for example, an information device such as a personal computer, a tablet information terminal, or a smartphone may be used as the terminal device 400. The terminal device 400 includes a display unit 410, a reception unit 420, a display control unit 430, a processing unit 440, and a communication control unit 450. The terminal device 400 is an example of an evaluation device that evaluates power consumption of equipment.

The display unit 410 displays various screens. The screen displayed on the display unit 410 includes an operation screen for receiving a user operation, an information presentation screen for presenting various types of information to the user, and the like. In the present embodiment, the screen displayed on the display unit 410 includes a screen displaying a result of comparison in the power consumption record information among a plurality of time ranges. Details of the screen displaying the result of the comparison in the power consumption record information will be described below.

The reception unit 420 receives an input operation by a user. In the present embodiment, as the input operation, for example, an operation of designating power consumption record information to be compared, an operation of instructing execution of processing for enabling the comparison in power consumption record information, an operation of instructing a method of displaying the comparison result, and the like are performed. A touch panel that is a combination of a touch sensor and a display area of the display unit 410 may be provided as the reception unit 420, and may be configured to receive an operation performed by touching an operation screen displayed on the display unit 410. When the reception unit 420 has such a configuration, various operations can be performed through an intuitive operation such as a touch operation on the screen.

The display control unit 430 controls display of a screen on the display unit 410. Specifically, for example, a screen is configured based on the information acquired from the server 300 and displayed on the display unit 410, or control is performed to switch the display on the display unit 410.

The processing unit 440 executes various types of calculation processing. In the present embodiment, the processing unit 440 processes and evaluates the power consumption record information acquired from the server 300 in response to an operation performed on the operation screen displayed on the display unit 410. Then, the processing unit 440 outputs data of the evaluation result to the display unit 410 and displays the data. The processing unit 440 is an example of an output unit. Here, the processing on the power consumption record information includes processing of comparison in power consumption record information between two different time ranges, among pieces of power consumption record information in a plurality of time ranges. The processing further includes processing of correcting at least one of the pieces of power consumption record information in the two different time ranges to be compared, to enable the information to be compared with the other one of the pieces of power consumption record information.

The power consumption records in the two different time ranges are usually under different environmental conditions in the periods in which operations of the equipment appliance 200 related to the respective records are performed. In addition, the control content may vary between the periods in which the operations of the equipment appliance 200 related to the respective records are performed. Therefore, to enable comparison between these pieces of power consumption record information, correction is performed in accordance with the difference in environmental conditions and control contents. Specific contents of the correction will be described below.

The communication control unit 450 is connected to the server 300 and transmits and receives information to and from the server 300. Specifically, the communication control unit 450 receives pieces of power consumption record information in a plurality of time ranges to be compared, from the server 300. The communication control unit 450 transmits information indicating the content of the user's operation received by the reception unit 420 to the server 300. The communication control unit 450 is an example of an acquisition unit.

<Hardware Configuration of Terminal Device 400>

Figure 7:
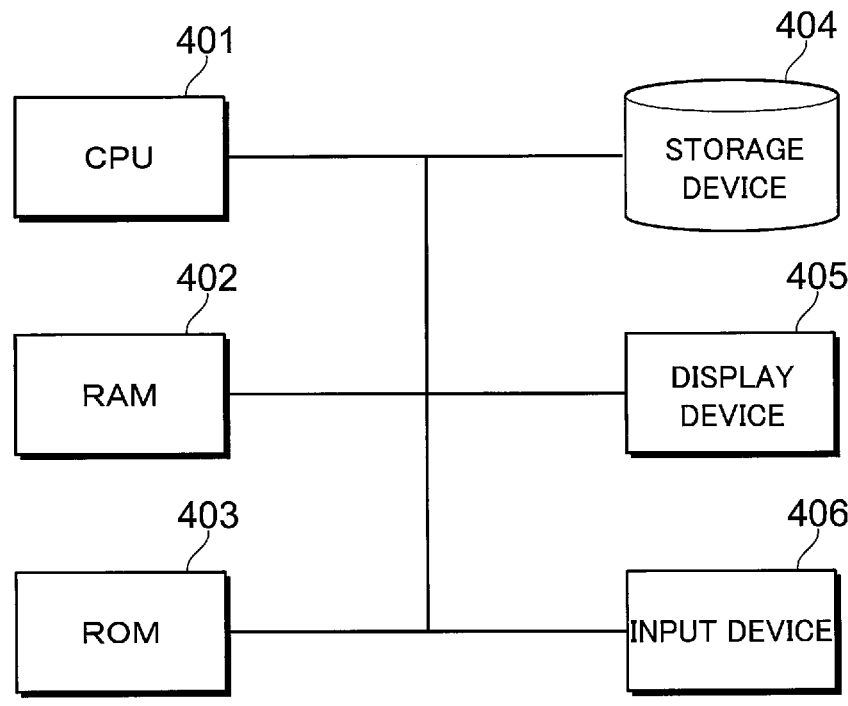
FIG. 7 is a diagram illustrating a hardware configuration example of the terminal device.

FIG. 7 is a diagram illustrating a hardware configuration example of the terminal device 400. The terminal device 400 is implemented by, for example, a computer. The computer that implements the terminal device 400 includes a CPU 401 that is an arithmetic unit, as well as a RAM 402, a ROM 403, and a storage device 404 that serve as a storage unit, a display device 405, and an input device 406. The RAM 402 is a main storage device, and is used as a working memory when the CPU 401 executes calculation processing. The ROM 403 stores programs and data such as a set value prepared in advance, and the CPU 401 can directly read the program and the data from the ROM 403 and execute the processing. The storage device 404 is a unit for storing programs and data. The storage device 404 stores a program, and the CPU 401 loads the program stored in the storage device 404 onto the main storage device and executes the program. In addition, a result of processing by the CPU 401 is stored and held in the storage device 404. For example, a magnetic disk device, a solid state drive (SSD), or the like is used as the storage device 404.

The display device 405 is a display unit that displays an image under the control by the CPU 401. As the display device 405, for example, a liquid crystal display or the like is used. The input device 406 is an input unit for a user to perform an input operation. As the input device 406, for example, a keyboard, a pointing device such as a mouse, or an input device such as a touch sensor is used. A touch panel may be configured in which a transparent touch sensor is used as the input device 406, the touch sensor is disposed to overlap the display area of the display device 405, and input can be performed by touching an operation screen displayed on the display device 405 with a finger or the like.

When the terminal device 400 is implemented by the computer illustrated in FIG. 7, the functions of the display control unit 430, the processing unit 440, and the communication control unit 450 described with reference to FIG. 6 are implemented by, for example, the CPU 401 executing a program. The display unit 410 is implemented by the display device 405. The reception unit 420 is implemented by the input device 406. The hardware configuration illustrated in FIG. 7 is merely an example of a case where the terminal device 400 is implemented by a computer.

<Method of Evaluating Power Consumption Record>

Next, a method of evaluating the power consumption record will be described. In the present embodiment, comparison in the power consumption record information between a plurality of time ranges is performed to evaluate the power consumption record in each time range. The power consumption record in each time range depends on the environmental condition of the corresponding period. Therefore, the power consumption records in the two periods to be compared have a difference based on the difference in the environmental condition between the two periods. Further, when certain energy-saving control is performed on the operation of the equipment appliance 200 in one of the two periods to be compared and the certain energy-saving control is not performed on the operation of the equipment appliance 200 in the other period, the power consumption records in the two periods to be compared have a difference based on whether the certain energy-saving control is performed or not. Therefore, at least one of the pieces of power consumption record information to be compared may be corrected so that the environmental condition and energy-saving control correspond to the other one of the pieces of power consumption record information.

In this case, depending on which of the pieces of power consumption record information to be compared is to be corrected and which of the environmental condition and the energy-saving control is to be the target of the correction, a combination of comparison targets may include a plurality of sets. A description on the combination of the comparison targets is given below, based on the modes of the power consumption record information in each of a case where correction in accordance with the difference in the environmental condition is performed and a case where correction in accordance with whether the energy-saving control is performed or not, on each of the two pieces of the power consumption record information to be compared.

As an example, a description will be given on a case where comparison in the power consumption record information is made between two different time ranges that are each one year (one year from January 1 to December 31, for example). These two time periods related to the power consumption record information as the comparison target are assumed to be one year period (hereafter, referred to as "current year") and one year before that (hereafter, referred to as "previous year"). It is assumed that certain energy-saving control is performed on the operation of the equipment appliance 200 in the current year, and the certain energy-saving control is not performed on the operation of the equipment appliance 200 in the previous year.

Figure 8A:
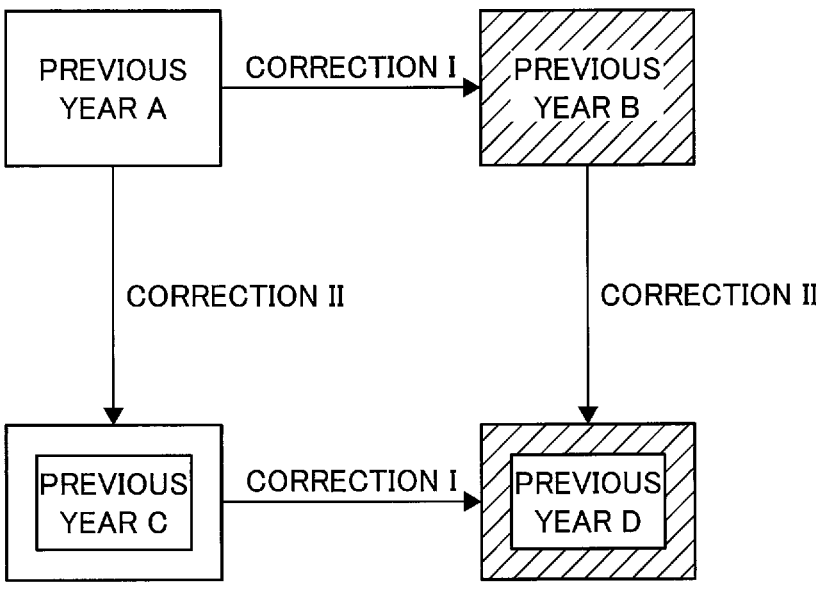
FIGS. 8A and 8B are diagrams illustrating modes of correction on power consumption record information, FIG. 8A illustrating a mode of correction on power consumption record information of the previous year, FIG. 8B illustrating a mode of correction on power consumption record information of the current year.
Figure 8B:
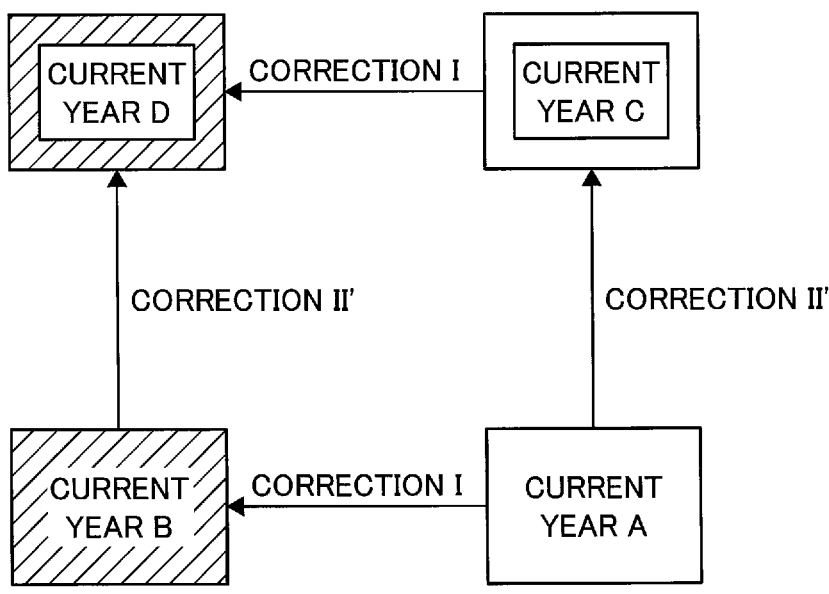

FIGS. 8A and 8B are diagrams illustrating a mode of correction on the power consumption record information. FIG. 8A illustrates a mode of correction on the power consumption record information of the previous year, and FIG. 8B illustrates a mode of correction on the power consumption record information of the current year. Between the power consumption record information of the previous year and the power consumption record information of the current year, there is a difference based on a difference in environmental condition between the previous year and the current year and a difference based on whether the certain energy-saving control is performed or not. Thus, as the correction for the power consumption record information, correction of removing the influence based on the difference in environmental condition and correction of removing the influence based on whether the certain energy-saving control is performed or not may be performed. In the following description, the former correction is referred to as "correction I", and the latter correction is referred to as "correction II". The correction II includes: correction in which the power consumption record information in the period in which the certain energy-saving control is not performed is converted into power consumption record information under an assumption that the certain energy-saving control is performed; and correction in which the power consumption record information in the period in which the certain energy-saving control is performed is converted into power consumption record information under an assumption that the certain energy-saving control is not performed. As illustrated in FIG. 8A and FIG. 8B, the latter correction II is referred to as "correction II'" when these modes of correction are distinguished from each other.

In FIG. 8A and FIG. 8B, each node represents each power consumption record information classified according to the mode of correction. Power consumption record information that is obtained in each of the time ranges ("current year" and "previous year") and is not subjected to correction, is defined as a node "A" (described as "previous year A" and "current year A" for the distinction in terms of time range in FIGS. 8A and 8B. The same applies to each node in the following description) and is represented by a white rectangle. Power consumption record information subjected to the correction I is defined as a node "B" and is represented by a hatched rectangle. Power consumption record information subjected to the correction II (correction II' in FIG. 8B) is defined as a node "C" and is represented by a double lined rectangle. Power consumption record information subjected to both the correction I and the correction II is defined as a node "D" and is represented by a double lined rectangle with a hatched outer frame.

In the example illustrated in FIG. 8A, a node "previous year A" indicates the power consumption record information of the previous year in which the certain energy-saving control was not performed. A node "previous year B" is a result of performing the correction I on the power consumption record information of the previous year. Here, the correction I is a correction for converting the power consumption record information of the previous year into the power consumption record information when the equipment appliance 200 is operated under the environmental condition of the current year. A node "previous year C" is a result of performing the correction II on the power consumption record information of the previous year. Here, the correction II is a correction in which the power consumption record information of the previous year is converted into power consumption record information to be obtained as a result of performing the certain energy-saving control. A node "previous year D" is a result of performing the correction I and the correction II on the power consumption record information of the previous year. The power consumption record information of the node "previous year D" is a result of performing the correction II on the power consumption record information of the node "previous year B" on which the correction I has already been performed, or performing the correction I on the power consumption record information of the node "previous year C" on which the correction II has already been performed.

In the example illustrated in FIG. 8B, a node "current year A" indicates power consumption record information of the current year in which the certain energy-saving control is performed. A node "current year B" is a result of performing the correction I on the power consumption record information of the current year. Here, the correction I is a correction for converting the power consumption record information of the current year into the power consumption record information to be obtained when the equipment appliance 200 is operated under the environmental condition of the previous year. A node "current year C" is a result of performing the correction II' on the power consumption record information of the current year. Here, the correction II' is a correction in which the power consumption record information of the current year is converted into power consumption record information to be obtained when the certain energy-saving control is not performed. A node "current year D" is a result of performing the correction I and the correction II' on the power consumption record information of the current year. The power consumption record information of the node "current year D" is a result of performing the correction II' on the power consumption record information of the node "current year B" on which the correction I has already been performed, or performing the correction I on the power consumption record information of the node "current year C" on which the correction II' has already been performed.

Considering the correction I and the correction II, in FIG. 8A and FIG. 8B, the upper left nodes ("previous year A" in FIG. 8A and "current year D" in FIG. 8B) represent the power consumption record information in a case where the energy-saving control is not performed under the environmental condition of the previous year. More specifically, the node "previous year A" in FIG. 8A is a recorded value obtained by the operation of the equipment appliance 200 in the previous year, and the node "current year D" in FIG. 8B is a calculated value based on the power consumption record obtained by the operation of the equipment appliance 200 in the current year.

The upper right nodes ("previous year B" in FIG. 8A and "current year C" in FIG. 8B) represent the power consumption record information in a case where the energy-saving control is not performed under the environmental condition of the current year. More specifically, the node "previous year B" in FIG. 8A is a calculated value based on the power consumption record obtained by the operation of the equipment appliance 200 in the previous year, and the node "current year C" in FIG. 8B is a calculated value based on the power consumption record obtained by the operation of the equipment appliance 200 in the current year.

The lower left nodes ("previous year C" in FIG. 8A and "current year B" in FIG. 8B) represent the power consumption record information in a case where the energy-saving control is performed under the environmental condition of the previous year. More specifically, the node "previous year C" in FIG. 8A is a calculated value based on the power consumption record obtained by the operation of the equipment appliance 200 in the previous year, and the node "current year B" in FIG. 8B is a calculated value based on the power consumption record obtained by the operation of the equipment appliance 200 in the current year.

The lower right nodes ("previous year D" in FIG. 8A and "current year A" in FIG. 8B) represent the power consumption record information in a case where the energy-saving control is performed under the environmental condition of the current year. More specifically, the node "previous year D" in FIG. 8A is a calculated value based on a power consumption record obtained by the operation of the equipment appliance 200 in the previous year, and the node "current year A" in FIG. 8B is a recorded value obtained by the operation of the equipment appliance 200 in the current year.

The correction I and the correction II will be further described. Regarding the correction I in which the environmental condition is converted, elements of the environmental condition mainly include the temperature and the humidity. Furthermore, various weather conditions such as a sunshine time, a wind direction, a wind speed, and a rainfall amount may be taken into consideration as the environmental conditions. Still, the temperature and the humidity are elements having a huge influence on the power consumption of the equipment appliance 200, and the influence of the temperature is particularly large. Therefore, in a simplified case, the correction may be performed while focusing on the temperature or the temperature and the humidity as the environmental condition. Specifically, one of the pieces of power consumption record information to be compared may be corrected by converting the data related to the temperature (or the temperature and humidity) of the year corresponding to the one of the pieces of power consumption record information to match data related to the temperature (or the temperature and humidity) of the year corresponding to the other one of the pieces of information.

Regarding the correction II, whether the energy-saving control is performed or not corresponds to distinction for the certain energy-saving control applied to one of the pieces of power consumption record information to be compared. In the example illustrated in FIGS. 8A and 8B, whether the certain energy-saving control is performed or not for the operation of the equipment appliance 200 related to the power consumption record information of the current year is the question. Thus, whether the energy-saving control other than the target certain energy-saving control is performed or not for the other one of the pieces of power consumption record information to be compared is irrelevant. In the example illustrated in FIGS. 8A and 8B, for the operation of the equipment appliance 200 related to the power consumption record information of the previous year, the energy-saving control may not be performed at all, and furthermore, energy-saving control different from the certain energy-saving control performed on the operation of the equipment appliance 200 related to the power consumption record information of the current year may be performed.

Now, a consideration will be given on combinations of comparison targets for which the power consumption record information is evaluated by the processing unit 440 of the terminal device 400, under each mode of the power consumption record information illustrated in FIGS. 8A and 8B. The power consumption record information of the previous year and the power consumption record information of the current year to be compared includes the following 16 types of combinations {previous year A, current year A}, {previous year A, current year B}, {previous year A, current year C}, {previous year A, current year D}, {previous year B, current year A}, {previous year B, current year B}, {previous year B, current year C}, {previous year B, current year D}, {previous year C, current year A}, {previous year C, current year B}, {previous year C, current year C}, {previous year C, current year D}, {previous year D, current year A}, {previous year D, current year B}, {previous year D, current year C}, and {previous year D, current year D} in the example illustrated in FIGS. 8A and 8B.

Each set of comparison targets will be individually considered.

The combination {previous year A, current year A} is a combination of the recorded value of the previous year and the recorded value of the current year. The comparison for this combination is a comparison between the pieces of power consumption record information different from each other in the environmental condition and whether the certain energy-saving control is performed or not.

The combination {previous year A, current year B} is a combination of the recorded value of the previous year and a corrected value as a result of correcting the record of the current year to correspond to the environmental condition of the previous year. The comparison for this combination is a comparison between the power consumption record information (previous year) in a case where the certain energy-saving control is not performed under the environmental condition of the previous year, and the power consumption record information (current year) in a case where the certain energy-saving control is performed.

The combination {previous year A, current year C} is a combination of the recorded value of the previous year and a corrected value obtained by eliminating the effect of the certain energy-saving control from the record of the current year. The comparison for this combination is a comparison between the power consumption record information in a case where the certain energy-saving control is not performed under the environmental condition of the previous year, and the power consumption record information in a case where the certain energy-saving control is not performed under the environmental condition of the current year.

The combination {previous year A, current year D} is a combination of the recorded value of the previous year and a corrected value obtained by correcting the recorded value of the current year to correspond to the environmental condition of the previous year and eliminating the effect of the certain energy-saving control. The comparison for this combination is a comparison between the recorded value and a value obtained by the correction, related to the power consumption record in a case where the energy-saving control is not performed under the environmental condition of the previous year.

The combination {previous year B, current year A} is a corrected value as a result of correcting the record of the previous year to correspond to the environmental condition of the current year and the recorded value of the current year. The comparison for this combination is a comparison between the power consumption record information (previous year) in a case where the certain energy-saving control is not performed under the environmental condition of the current year, and the power consumption record information (current year) in a case where the certain energy-saving control is performed.

The combination {previous year B, current year B} is a combination of a corrected value as a result of correcting the record of the previous year to correspond to the environmental condition of the current year and a corrected value as a result of correcting the record of the current year to correspond to the environmental condition of the previous year. This combination involves the correction in which the records of the previous year and the current year are each converted to correspond to the environmental condition of the counterpart, and thus may be excluded from the combinations of the comparison targets.

The combination {previous year B, current Year C} is a combination of a corrected value as a result of correcting the record of the previous year to correspond to the environmental condition of the current year and a corrected value as a result of eliminating the effect of the certain energy-saving control from the record of the current year. The comparison for this combination is a comparison between the values obtained by the correction, related to the power consumption record in a case where the energy-saving control is not performed under the environmental condition of the current year.

The combination {previous year B, current year D} is a combination of a corrected value as a result of correcting the record of the previous year to correspond to the environmental condition of the current year and a corrected value as a result of correcting the recorded value of the current year to correspond to the environmental condition of the previous and eliminating the effect of the certain energy-saving control. This combination involves the correction in which the records of the previous year and the current year are each converted to correspond to the environmental condition of the counterpart, and thus may be excluded from the combinations of the comparison targets.

The combination {previous year C, current year A} is a combination of a corrected value as a result of adding the effect of the certain energy-saving control to the record of the previous year and the recorded value of the current year. The comparison for this combination is a comparison between the power consumption record information in a case where the certain energy-saving control is performed under the environmental condition of the previous year, and the power consumption record information in a case where the certain energy-saving control is performed under the environmental condition of the current year.

The combination {previous year C, current year B} is a combination of a corrected value as a result of adding the effect of the certain energy-saving control to the record of the previous year and a corrected value as a result of correcting the record of the current year to correspond to the environmental condition of the previous year. The comparison for this combination is a comparison between the values obtained by the correction, related to the power consumption record in a case where the energy-saving control is performed under the environmental condition of the previous year.

The combination {previous year C, current year C} is a combination of a corrected value as a result of adding the effect of the certain energy-saving control to the record of the previous year and a corrected value as a result of eliminating the effect of the certain energy-saving control from the record of the current year. The comparison for this combination involves the correction in which whether the energy-saving control is performed or not is swapped between the records of the previous year and the current year, and thus may be excluded from the combinations of the comparison targets.

The combination {previous year C, current year D} is a combination of a corrected value as a result of adding the effect of the certain energy-saving control to the record of the previous year and a corrected value as a result of correcting the recorded value of the current year to correspond to the environmental condition of the previous year and eliminating the effect of the certain energy-saving control. The comparison for this combination involves the correction in which whether the energy-saving control is performed or not is swapped between the records of the previous year and the current year, and thus may be excluded from the combinations of the comparison targets.

The combination {previous year D, current year A} is a combination of a corrected value obtained by correcting the recorded value of the previous year to correspond to the environmental condition of the previous year and eliminating the effect of the certain energy-saving control and the recorded value of the current year. The comparison for this combination is a comparison between the recorded value and a value obtained by the correction, related to the power consumption record in a case where the energy-saving control is performed under the environmental condition of the current year.

The combination {previous year D, current year B} is a combination of a corrected value as a result of correcting the recorded value of the previous year to correspond to the environmental condition of the previous year and eliminating the effect of the certain energy-saving control and a corrected value as a result of correcting the record of the current year to correspond to the environmental condition of the previous year. This combination involves the correction in which the records of the previous year and the current year are each converted to correspond to the environmental condition of the counterpart, and thus may be excluded from the combinations of the comparison targets.

The combination {previous year D, current year C} is a combination of a corrected value as a result of correcting the recorded value of the previous year to correspond to the environmental condition of the previous year and eliminating the effect of the certain energy-saving control, and a corrected value as a result of eliminating the effect of the certain energy-saving control from the record of the current year. This combination involves the correction in which whether the energy-saving control is performed or not is swapped between the records of the previous year and the current year, and thus may be excluded from the combinations of the comparison targets.

The combination {previous year D, current year D} is a combination of a corrected value as a result of correcting the recorded value of the previous year to correspond to the environmental condition of the previous year and eliminating the effect of the certain energy-saving control, and a corrected value as a result of correcting the recorded value of the current year to correspond to the environmental condition of the previous year and eliminating the effect of the certain energy-saving control. This combination involves the correction in which the records of the previous year and the current year are each converted to correspond to the environmental condition of the counterpart, and whether the energy-saving control is performed or not is swapped between the records of the previous year and the current year, and thus may be excluded from the combinations of the comparison targets.

Comparison for each of the combinations {previous year A, current year A}, {previous year A, current year B}, and {previous year B, current year A} among the combinations is particularly effective for confirmation of the effect of the certain energy-saving control performed for the operation of the equipment appliance 200 in the current year, as the evaluation of the power consumption record. The comparisons for {previous year A, current year B} and {previous year B, current year A} among the combinations are even more effective for the confirmation of the effect of the certain energy-saving control.

These combinations have the environmental condition of one of the power consumption record information of the previous year and the power consumption record information of the current year corrected to match the environmental condition of the other. Thus, direct comparison in the power consumption record can be made between cases where the certain energy-saving control is and is not performed under the same environmental condition.

Comparison for the combinations {previous year A, current year C} and {previous year C, current year A} among the combinations is particularly effective for confirmation of the influence of the difference in the environmental condition between the previous year and the current year on the operation of the equipment appliance 200, as the evaluation of the power consumption record. These combinations involve correction on one of the power consumption record information of the previous year and the power consumption record information of the current year performed in such a manner that whether the certain energy-saving control is performed or not corresponds to the other one of the power consumption record information. Thus, direct comparison can be made between the power consumption record under the environmental condition of the previous year and the power consumption record under the environmental condition of the current year, without being affected by whether the certain energy-saving control is performed or not.

Comparison for each of the combinations {previous year A, current year D}, {previous year B, current year C}, {previous year C, current year B}, and {previous year D, current year A} among the combinations is particularly effective for confirmation of the accuracy of the correction as the evaluation of the power consumption record. The correction is performed on at least one of the power consumption record information of the previous year and the power consumption record information of the current year in such a manner that both of the environmental condition and whether the certain energy-saving control is performed or not correspond to the other one of the power consumption record information. Thus, the power consumption record information match in each combination, as long as the correction is appropriately performed. Therefore, when a difference in power consumption record information is detected by the comparison for the combination, the difference is expected to be due to the accuracy of the correction.

The accuracy of the correction related to the environmental condition can be individually determined through comparison in the power consumption record information between a plurality of time ranges in which the condition of the energy-saving control is the same, with the correction performed to match the environmental condition. When the conditions of the energy-saving control are the same, a difference between the plurality of pieces of power consumption record information is based only on the difference in the environmental condition. Thus, when the correction to match the pieces of power consumption record information as the comparison targets of the comparison, is applied to the correction related to the environmental condition in the comparison for each of the combinations {previous year A, current year D}, {previous year B, current year C}, {previous year C, current year B}, and {previous year D, current year A}, a difference in the power consumption record information detected in this comparison can be identified as being caused by the accuracy of the correction related to the energy-saving control.

<Method of Designating Power Consumption Record Information to be Comparison Target>

The power consumption record information is designated to be the comparison target for the evaluation of the power consumption record, by a user performing an operation for the designation on an operation screen displayed on the display unit 410 of the terminal device 400 for designating the power consumption record information to be the comparison target, for example.

Figure 9:
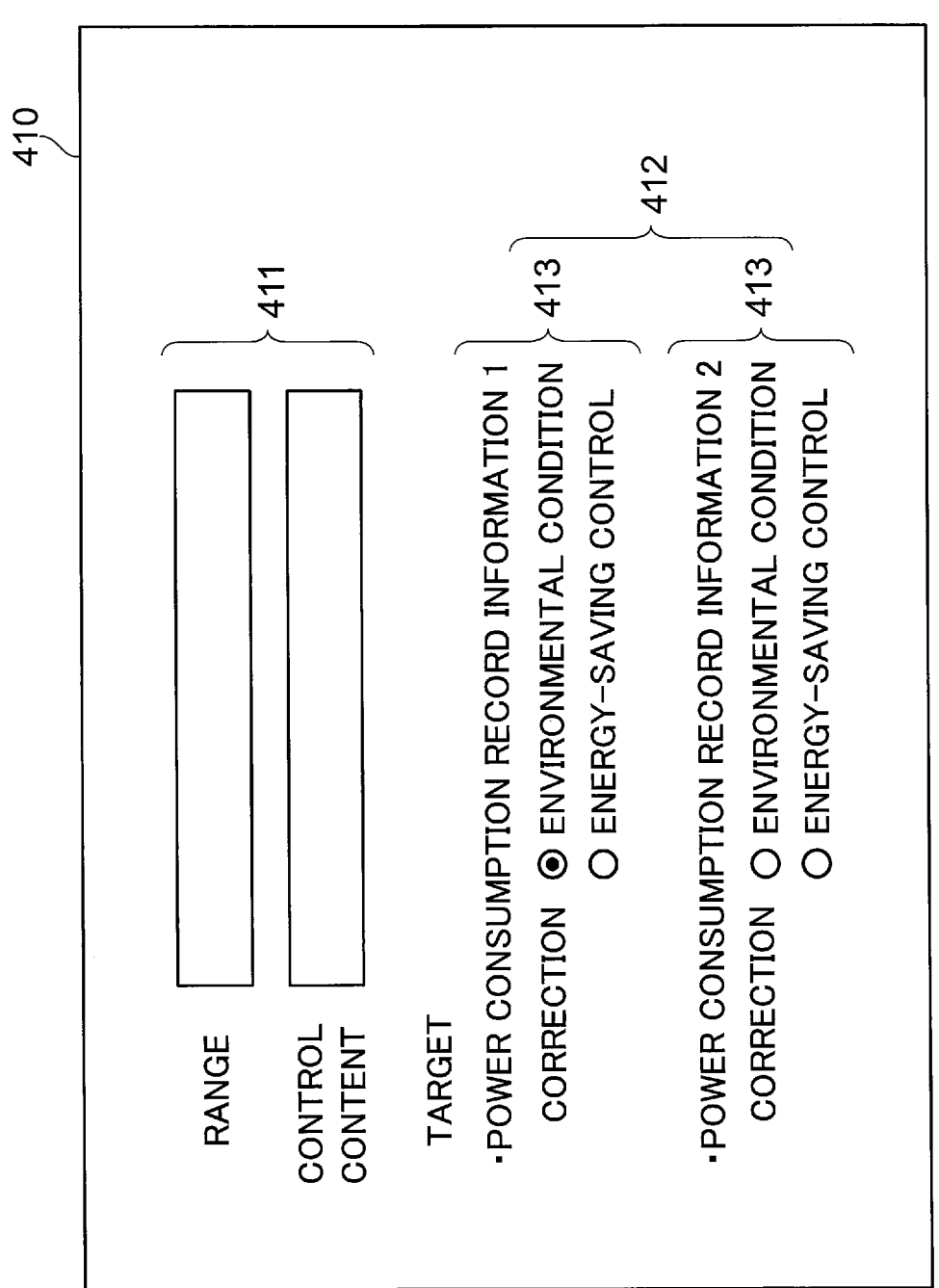
FIG. 9 is a diagram illustrating an example of an operation screen displayed on a display unit of the terminal device.

FIG. 9 is a diagram illustrating an example of the operation screen displayed on the display unit 410 of the terminal device 400. The operation screen illustrated in FIG. 9 is provided with a designation information input field 411 in which, for example, a time range (described as "RANGE" in FIG. 9) or the content of energy-saving control (described as "CONTROL CONTENT" in FIG. 9) can be input as a designation condition. The user inputs designation information in the designation information input field 411 to designate each power consumption record information to be the comparison target. In the example configuration illustrated in FIG. 9, the designation information is input by text input, but the present disclosure is not limited to this configuration. For example, a configuration may be employed in which a time range that can be designated, the contents of energy-saving control, and the like are displayed in a menu, and selection by the user is received. Alternatively, when part of the designated conditions is input, other designated conditions that can be input may be displayed on the operation screen, and selection by the user may be received.

When the user inputs designation information in the designation information input field 411, the terminal device 400 accesses the server 300 to acquire power consumption record information matching the designation information, and displays identification information of the acquired power consumption record information on the display unit 410. At this time, when there are three or more pieces of power consumption record information that match the designation information, the terminal device 400 may display a list of the acquired pieces of power consumption record information and receive selection of the comparison target by the user. In the example illustrated in FIG. 9, power consumption record information 1 and power consumption record information 2 are displayed as display 412 of the acquired power consumption record information.

When the power consumption record information as the comparison target is displayed on the operation screen illustrated in FIG. 9, the user designates correction for the power consumption record information. In the example illustrated in FIG. 9, for each of the power consumption record information 1 and the power consumption record information 2, a correction instruction field 413 is displayed for receiving designation of whether or not to perform correction related to the environmental condition and correction related to the energy-saving control, through checking of an item. In the illustrated example, designation is made in such a manner that the correction related to the environmental condition is to be performed on the power consumption record information 1, and no correction is to be performed on the power consumption record information 2. Assuming that the power consumption record information 1 and the power consumption record information 2 are the power consumption record information of the previous year and the power consumption record information of the current year as described above with reference to FIGS. 8A and 8B, when the correction designated in the correction instruction field 413 of FIG. 9 is performed, a combination {previous year B, current year A} of the power consumption record information is the comparison target.

The method of designating the power consumption record information as the comparison target is not limited to the above-described designation method using the operation screen, as long as the power consumption record information that can be a comparison target and the type of correction to be performed on the power consumption record information can be designated. In the above-described example, designation information is input to designate each power consumption record information to be the comparison target. Alternatively, in response to designation of one power consumption record information, pieces of power consumption record information that can be a comparison target may be displayed on the operation screen and selection by the user may be received. The designation condition for the power consumption record information as the comparison target is not limited to the above-described time range and content of the energy-saving control.

<Method of Displaying Comparison Result>

The terminal device 400 displays an evaluation result of the power consumption record information by the processing unit 440 on the display unit 410. The display method is not particularly limited as long as the comparison result of the power consumption record information is indicated, and the specific display mode is not particularly limited. For example, the power consumption record information as the comparison target may be graphed and displayed on the display unit 410 in a format enabling easy visual comparison. Some specific display examples will be described below.

Figure 10:
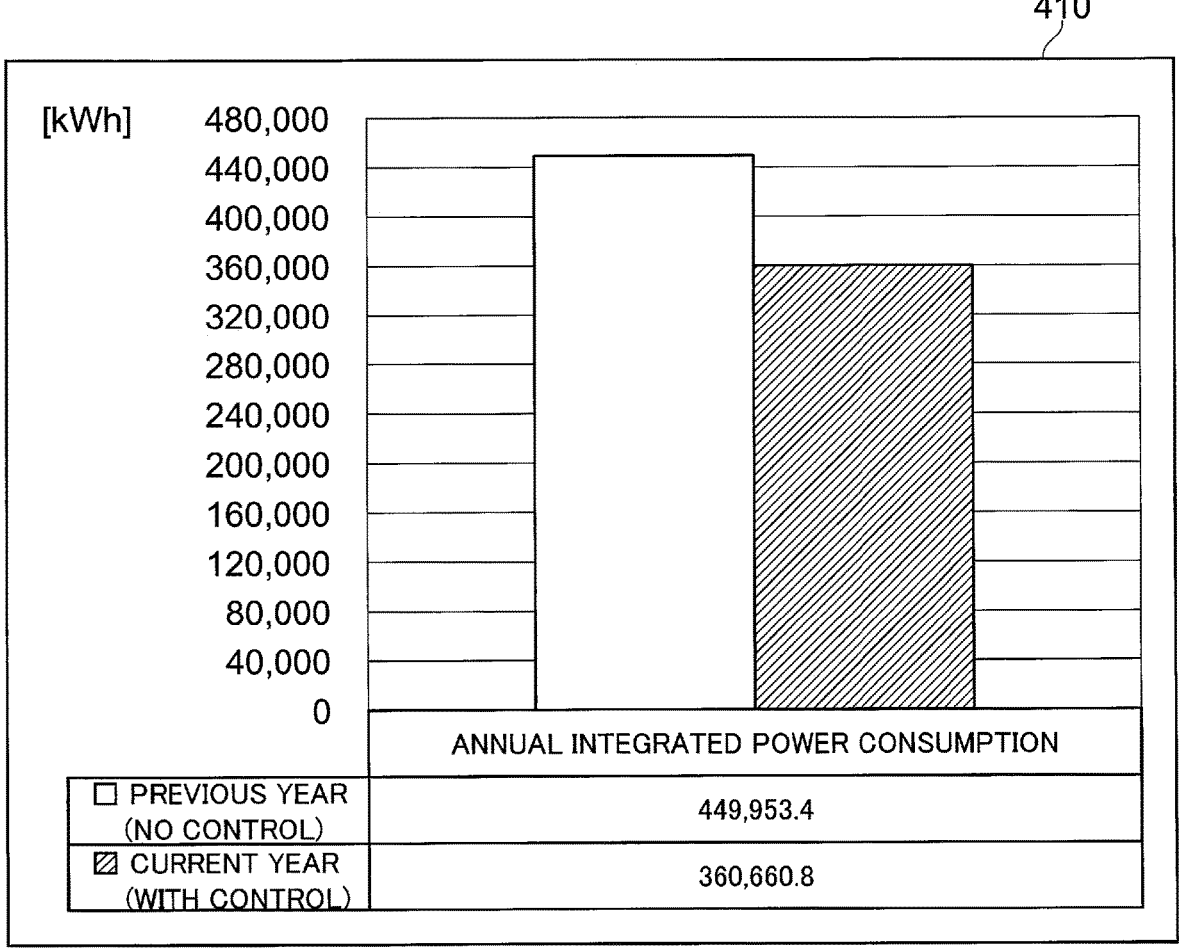
FIG. 10 is a diagram illustrating a display example of a result of processing on the power consumption record information.

FIG. 10 is a diagram illustrating a display example of a result of processing on the power consumption record information. In the example illustrated in FIG. 10, the time range is set to one year, and the comparison result of the power consumption record information for each year is displayed in a graph of the integrated value of the power consumption for each year (described as "ANNUAL INTEGRATED POWER CONSUMPTION" in FIG. 10). In the example illustrated in FIG. 10, a result of comparison between the power consumption record information of the previous year ("PREVIOUS YEAR" in FIG. 10) and the power consumption record information of the current year ("CURRENT YEAR" in FIG. 10) described with reference to FIGS. 8A and 8B is illustrated. In the example illustrated in FIG. 10, it is assumed that the certain energy-saving control is not performed on the operation of the equipment appliance 200 related to the power consumption record information of the previous year (described as "NO CONTROL" in FIG. 10), and the certain energy-saving control is performed on the operation of the equipment appliance 200 related to the power consumption record information of the current year (described as "WITH CONTROL" in FIG. 10). Further, when these pieces of power consumption record information are compared, the environmental condition is corrected to match the condition of the previous year or the current year. Therefore, the data related to the comparison target displayed in the graph corresponds to the combination {previous year A, current year B} or {previous year B, current year A} illustrated in FIGS. 8A and 8B.

In the example illustrated in FIG. 10, the annual integrated power consumption in the previous year is 449953.4 kWh, and the annual integrated power consumption in the current year is 360660.8 kWh. Therefore, by performing the certain energy-saving control, the annual integrated power consumption in the current year is reduced from the annual integrated power consumption in the previous year. In the display example in FIG. 10, this result is also illustrated in a graph, and the decrease in the annual integrated power consumption is displayed to be visually recognized intuitively and easily.

Figure 11:
FIG. 11 is a diagram illustrating another display example of a result of processing on the power consumption record information.

FIG. 11 is a diagram illustrating another display example of a result of processing on the power consumption record information. In the example illustrated in FIG. 11, the time range is set to one year, and the comparison result of the power consumption record information for each year is displayed in a graph of the power consumption in each month ("APRIL" to "MARCH" in FIG. 11). In the example illustrated in FIG. 11, the result of comparison between the power consumption record information of the previous year and the power consumption record information of the current year is displayed as in FIG. 10. In the example illustrated in FIG. 11, it is assumed that the certain energy-saving control is not performed on the operation of the equipment appliance 200 related to the power consumption record information of the previous year (described as "NO CONTROL" in FIG. 11), and the certain energy-saving control is performed on the operation of the equipment appliance 200 related to the power consumption record information of the current year (described as "WITH CONTROL" in FIG. 11). Further, when these pieces of power consumption record information are compared, the environmental condition is corrected to match the condition of the previous year or the current year. Therefore, the data related to the comparison target displayed in the graph corresponds to the combination {previous year A, current year B} or {previous year B, current year A} illustrated in FIGS. 8A and 8B.

In the example illustrated in FIG. 11, the value of the power consumption based on the power consumption record information of the previous year and the value of the power consumption based on the power consumption record information of the current year are displayed for each corresponding month. Referring to FIG. 11, while the difference varies among months, the power consumption in the current year is reduced from the power consumption in the previous year, due to the energy-saving control performed in all months except November. In the display example in FIG. 11, the result is also displayed in a graph, and thus the difference in the power consumption in each month is displayed to be visually recognized intuitively and easily.

Figure 12:
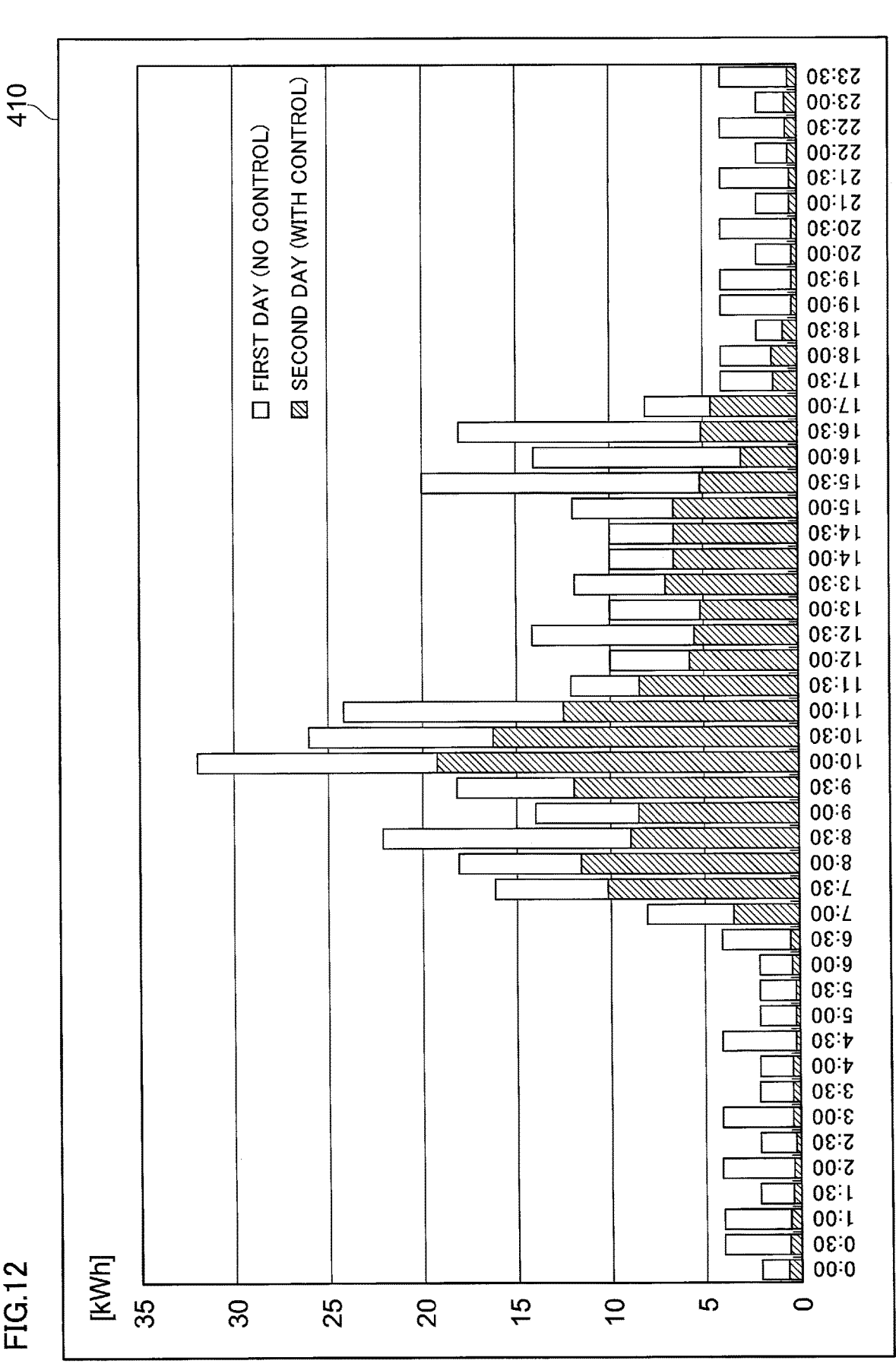
FIG. 12 is a diagram illustrating another display example of a result of processing on the power consumption record information.

FIG. 12 is a diagram illustrating another display example of a result of processing on the power consumption record information. In the example illustrated in FIG. 12, the time range is one day, and the comparison result of the power consumption record information obtained for each time period (every 30 minutes) in a day selected as the comparison target is displayed in a graph of the power consumption for each time period (0:00 to 23:30 in FIG. 12). In the example illustrated in FIG. 12, it is assumed that the certain energy-saving control is not performed on the operation of the equipment appliance 200 based on the power consumption record information of the first day indicated by the white bar graph (described as "NO CONTROL" in FIG. 12), and the certain energy-saving control is performed on the operation of the equipment appliance 200 based on the power consumption record information of the second day indicated by the hatched bar graph (described as "WITH CONTROL" in FIG. 12). Further, when these pieces of power consumption record information are compared, the environmental condition is corrected to match the condition of the first day or the second day.

In the example illustrated in FIG. 12, the power consumption on the second day is smaller than the power consumption on the first day, due to the energy-saving control performed in each time period of one day. In the display example in FIG. 12, the result is displayed in a graph, and thus the difference in the power consumption in each month is displayed to be visually recognized intuitively and easily.

<Example of Correction Method>

A specific example of a method of correcting the power consumption record information will be described. First, a method of correction related to the environmental condition (correction I in FIGS. 8A and 8B) will be described. A possible example of this correction includes correction based on the characteristics of the equipment appliance 200 and correction based on actually measured data. In the correction based on the characteristics of the equipment appliance 200, for example, the power consumption record information is corrected in accordance with the characteristics of each appliance by using the characteristics information disclosed by the manufacturer of the equipment appliance 200. In an example where the equipment appliance 200 is an air conditioner, the characteristics information indicates how the characteristics of the output performance [kcal/h] and the power consumption [kW] of the air conditioner change depending on the outside air temperature and the indoor temperature. As a specific example, the characteristics information indicates that the power consumption is set to be 6.10 kW under the conditions that the outside air temperature is 35.0° C. and the indoor temperature is 19.5° C. during the cooling operation, and the power consumption is set to be 6.28 kW when the outside air temperature is 37.0° C. (the other conditions are the same). Thus, it can be seen that the power consumption in the case where the outside air temperature is 37.0° C. is larger than that in the case where outside air temperature is 35.0° C. by 0.18 kW. In this way, the amount of variation in the power consumption based on a difference in the environmental condition can be obtained by extracting the relationship between the environmental condition and the power consumption from the characteristics information of the equipment appliance 200.

On the other hand, in the correction based on the actually measured data, the environmental information and the information on the power consumption obtained by actually operating the equipment appliance 200 are used, the characteristic formula of the equipment appliance 200 is derived from the relationship therebetween, and the power consumption record information as the comparison target is corrected based on the obtained characteristic formula. As a method of deriving the characteristic formula from the environmental information and the information on the power consumption obtained through the actual operation, for example, an existing method such as regression analysis can be used. Alternatively, a method such as machine learning may be used. By substituting the value of the outside air temperature or the like in the environmental information into the characteristic formula derived, the power consumption under the environmental condition is obtained. As a result, it is possible to obtain the amount of variation in the power consumption based on the difference in the environmental information in each power consumption record information as the comparison target.

The environmental information may be acquired from the installation location of the equipment appliance 200 or a sensor provided in the equipment appliance 200 itself. Furthermore, the data related to the temperature and the humidity may be acquired by accessing an external server (such as, for example, a database of the Meteorological Agency). When the time range for the comparison target is one year, since two pieces of power consumption record information are compared, it is necessary to acquire data for at least two years.

Next, a method of correction related to the energy-saving control (correction II illustrated in FIGS. 8A and 8B) will be described. The correction related to the energy-saving control is performed, for example, using a correction formula derived based on a recorded value of the power consumption obtained by actually operating the equipment appliance 200 in advance in an experimental facility or the like. The operation of the equipment appliance 200 is performed with and without the energy-saving control related to the correction performed. Then, the correction formula is derived from the recorded value in each case obtained. For example, in a case where the equipment appliance 200 is an air conditioner, power consumption is measured for each condition (such as outside air temperature, indoor temperature, and air conditioning load) during operation, and the power consumption reduction effect is obtained for each condition. As a specific example, it is assumed that the actual measurement by the operation as described above has proved that by performing the energy-saving control, there is a reduction effect of 55% in the power consumption when the outside air temperature is 26° C., and there is a reduction effect of 20% in the power consumption when the outside air temperature is 32° C. In this case, the corrected value may be calculated in accordance with the actual value as described above, in the correction in which a value is obtained when the energy-saving control is performed on the power consumption record information on which the energy-saving control is not performed. On the other hand, in the correction in which a value is obtained when the energy-saving control is not performed on the power consumption record information on which the energy-saving control has been performed, the reverse operation of the reduction effect based on the actual value is performed, and the corrected value is calculated so that the power consumption increases by 122% (=0.55/(1−0.55)) when the outside air temperature is 26° C. and increases by 25% (=0.2/(1−0.2)) when the outside air temperature is 32° C.

In practice, since a plurality of parameters are assumed for the operation of the equipment appliance 200, a method of obtaining a correction formula by setting only one condition as a parameter and setting the other conditions to be the same is usually adopted. For example, the correction formula for the difference in the outside air temperature described above is derived using the outside air temperature as a parameter, with the indoor conditions such as the room temperature and the load set to be constant. Alternatively, the correction formula may be derived using the indoor temperature as a parameter with the outside air temperature set to be constant.

While an example of the correction method is described above, the above-described method is merely an example of the correction method that can be used in the present embodiment. In addition to the above-described method, the correction related to the environmental condition and the correction related to whether the energy-saving control is performed or not can be performed by various existing methods.

While the embodiment is described above, the technical scope of the present disclosure is not limited to the above-described embodiment. For example, in the above-described embodiment, the terminal device 400 acquires the power consumption record information as the comparison target from the server 300, and performs the correction related to the environmental condition and the correction related to whether the energy-saving control is performed or not. Alternatively, the power consumption record information as the comparison target and the correction content may be designated on the terminal device 400, and the power consumption record information may be corrected in the server 300. In this case, an instruction to correct the power consumption record information as the comparison target and a request to transmit the corrected power consumption record information are transmitted from the terminal device 400 to the server 300. After the target power consumption record information has been corrected in the server 300, the corrected power consumption record information is returned from the server 300 to the terminal device 400.

While two pieces of power consumption record information are compared in the above-described embodiment, three or more pieces of power consumption record information may be compared to evaluate each power consumption record information. The power consumption record information may be evaluated through comparison between corrected record information and record information not to be corrected for one power consumption record information, or comparison between pieces of record information subjected to different corrections. The former comparison is, for example, a comparison for combinations {current year A, current year B}, {current year A, current year C}, and {current year A, current year D} in the example illustrated in FIGS. 8A and 8B, and the latter comparison is, for example, a comparison for combinations {current year B, current year C}, {current year B, current year D}, and {current year C, current year D} in the example illustrated in FIGS. 8A and 8B. Furthermore, pieces of power consumption record information related to three or more nodes in the example illustrated in FIGS. 8A and 8B may be compared. For example, comparison may be performed for a combination {previous year A, previous year C, current year B} or a combination {previous year C, previous year D, current year A}. Through such comparison using various combinations, it is possible to obtain a larger amount of information on the variation in power consumption due to each correction.

Among the combinations of the nodes in the example illustrated in FIGS. 8A and 8B, the combination of pieces of recorded information as the comparison targets may be designated based on the status (such as, for example, the administrator, the user, or the maintenance company) of the user, who is the target of reception of the evaluation result, with respect to the equipment management, or the report case related to the evaluation performed in the past. The designation of the combination may be performed, for example, by extracting an optimal combination by machine learning. Furthermore, the present disclosure includes various modifications and configuration substitutions that do not depart from the scope of the technical idea of the present disclosure.

The embodiment described above can be understood as follows. An evaluation device of the present disclosure is the terminal device 400 configured to evaluate power consumption of equipment, and includes: the communication control unit 450 configured to acquire a power consumption record of the equipment; and the processing unit 440 configured to output data related to power consumption records before and after an energy-saving operation of the equipment, wherein the processing unit 440 corrects one of a power consumption record in an operation period before the energy-saving operation and a power consumption record in an operation period after the energy-saving operation to be comparable with the power consumption record in another one of the operation periods, and then outputs data related to the power consumption records before and after the energy-saving operation.

With this configuration, the power consumption record in the period in which the energy-saving control is performed and the power consumption record in the period in which the energy-saving control is not performed can be corrected in accordance with a purpose of the comparison, so that power consumption can be evaluated from various viewpoints.

In this configuration, the processing unit 440 may perform environmental condition correction in which one of the power consumption record before the energy-saving operation and the power consumption record after the energy-saving operation is corrected to correspond to an outside air environmental condition in an operation period related to the power consumption record in the other operation period.

With this configuration, comparison in effects of the energy-saving operation can be made between the periods before and after the energy-saving operation, without being affected by an outside air environment.

The processing unit 440 may further perform energy-saving correction in which a change in power consumption due to an energy-saving measure is corrected for the power consumption record as a result of the environmental condition correction.

This configuration enables the accuracy of the correction by the processing unit 440 to be confirmed.

The processing unit 440 may perform energy-saving correction in which a change in power consumption due to an energy-saving measure is corrected for the power consumption record in the other operation period different from the power consumption record as a result of the environmental condition correction.

This configuration enables the accuracy of the correction by the processing unit 440 to be confirmed.

The processing unit 440 may perform energy-saving correction in which a change in power consumption due to an energy-saving measure is corrected for one of the power consumption record before the energy-saving operation and the power consumption record after the energy-saving operation.

This configuration enables a difference in power consumption between the periods before and after the energy-saving operation due to a condition other than the energy-saving measure to be confirmed.

The processing unit 440 may further perform environmental condition correction in which the power consumption record as a result of the energy-saving correction is corrected to correspond to an outside air environmental condition in an operation period related to the power consumption record in the other operation period.

This configuration enables the accuracy of the correction by the processing unit 440 to be confirmed.

The processing unit 440 may perform environmental condition correction in which the power consumption record in the other operation period different from the power consumption record as a result of the energy-saving correction is corrected to correspond to an outside air environmental condition in the operation period related to the power consumption record as a result of the energy-saving correction.

This configuration enables the accuracy of the correction by the processing unit 440 to be confirmed.

A display unit may be further provided that is configured to display the power consumption records in the individual operation periods before and after the energy-saving operation, output from the processing unit 440.

This configuration enables the user to intuitively and visually recognize the comparison result of the corrected power consumption records easily.

A program of the present disclosure is a program causing a computer serving as an evaluation device configured to evaluate power consumption of equipment, to function as: the communication control unit 450 serving as an acquisition unit configured to acquire a power consumption record of the equipment; and the processing unit 440 serving as an output unit configured to output data related to power consumption records before and after an energy-saving operation of the equipment, wherein the computer functioning as the processing unit 440 corrects one of a power consumption record in an operation period before the energy-saving operation and a power consumption record in an operation period after the energy-saving operation to be comparable with the power consumption record in another one of the operation periods, and then outputs data related to the power consumption records before and after the energy-saving operation.

With the computer in which the program is installed, the power consumption record in the period in which the energy-saving control is performed and the power consumption record in the period in which the energy-saving control is not performed can be corrected in accordance with a purpose of the comparison, so that power consumption can be evaluated from various viewpoints.

REFERENCE SIGNS LIST

100 Control device, 200 Equipment appliance, 300 Server, 400 Terminal device, 410 Display unit, 411 Graph, 415 Graph, 420 Reception unit, 430 Display control unit, 440 Processing unit, 450 Communication control unit

The invention claimed is:

1. An evaluation device configured to evaluate power consumption of equipment, the evaluation device comprising:

memory storing a power consumption evaluation program; and a processor configured to execute the power consumption evaluation program to:

acquire a power consumption record of the equipment; and output data related to power consumption records before and after an energy-saving operation of the equipment, wherein the processor corrects one of a power consumption record in an operation period before the energy-saving operation and a power consumption record in an operation period after the energy-saving operation to be comparable with the power consumption record in the other operation period, and then outputs data related to the power consumption records before and after the energy-saving operation, wherein the processor performs environmental condition correction in which one of the power consumption record before the energy-saving operation and the power consumption record after the energy-saving operation is corrected to correspond to an outside air environmental condition in an operation period related to the power consumption record in the other operation period, and wherein the processor further performs energy-saving correction in which a change in power consumption due to an energy-saving measure is corrected for the power consumption record as a result of the environmental condition correction.

2. The evaluation device according to claim 1, wherein the processor performs energy-saving correction in which a change in power consumption due to an energy-saving measure is corrected for the power consumption record in the other operation period different from the power consumption record as a result of the environmental condition correction.

3. The evaluation device according to claim 1, wherein the processor performs environmental condition correction in which the power consumption record in the other operation period different from the power consumption record as a result of the energy-saving correction is corrected to correspond to an outside air environmental condition in the operation period related to the power consumption record as a result of the energy-saving correction.

4. The evaluation device according to claim 1, further comprising a display configured to display the power consumption records in the individual operation periods before and after the energy-saving operation, output from the processor.

5. The evaluation device according to claim 2, further comprising a display configured to display the power consumption records in the individual operation periods before and after the energy-saving operation, output from the processor.

6. The evaluation device according to claim 3, further comprising a display configured to display the power consumption records in the individual operation periods before and after the energy-saving operation, output from the processor.

7. A non-transitory computer readable medium storing a program causing a computer processor serving as an evaluation device configured to evaluate power consumption of equipment, to:

acquire a power consumption record of the equipment; and output data related to power consumption records before and after an energy-saving operation of the equipment, wherein the computer processor corrects one of a power consumption record in an operation period before the energy-saving operation and a power consumption record in an operation period after the energy-saving operation to be comparable with the power consumption record in the other operation period, and then outputs data related to the power consumption records before and after the energy-saving operation, wherein the processor performs environmental condition correction in which one of the power consumption record before the energy-saving operation and the power consumption record after the energy-saving operation is corrected to correspond to an outside air environmental condition in an operation period related to the power consumption record in the other operation period, and wherein the processor further performs energy-saving correction in which a change in power consumption due to an energy-saving measure is corrected for the power consumption record as a result of the environmental condition correction.

8. An evaluation device configured to evaluate power consumption of equipment, the evaluation device comprising:

memory storing a power consumption evaluation program; and a processor configured to execute the power consumption evaluation program to:

acquire a power consumption record of the equipment; and output data related to power consumption records before and after an energy-saving operation of the equipment, wherein the processor corrects one of a power consumption record in an operation period before the energy-saving operation and a power consumption record in an operation period after the energy-saving operation to be comparable with the power consumption record in the other operation period, and then outputs data related to the power consumption records before and after the energy-saving operation, wherein the processor performs energy-saving correction in which a change in power consumption due to an energy-saving measure is corrected for one of the power consumption record before the energy-saving operation and the power consumption record after the energy-saving operation, and wherein the processor further performs environmental condition correction in which the power consumption record as a result of the energy-saving correction is corrected to correspond to an outside air environmental condition in an operation period related to the power consumption record in the other operation period.

9. A non-transitory computer readable medium storing a program causing a computer processor serving as an evaluation device configured to evaluate power consumption of equipment, to:

acquire a power consumption record of the equipment; and output data related to power consumption records before and after an energy-saving operation of the equipment, wherein the computer processor corrects one of a power consumption record in an operation period before the energy-saving operation and a power consumption record in an operation period after the energy-saving operation to be comparable with the power consumption record in the other operation period, and then outputs data related to the power consumption records before and after the energy-saving operation, wherein the processor performs energy-saving correction in which a change in power consumption due to an energy-saving measure is corrected for one of the power consumption record before the energy-saving operation and the power consumption record after the energy-saving operation, and wherein the processor further performs environmental condition correction in which the power consumption record as a result of the energy-saving correction is corrected to correspond to an outside air environmental condition in an operation period related to the power consumption record in the other operation period.

* * * * *